US011259466B2

(12) United States Patent
Farley et al.

(10) Patent No.: US 11,259,466 B2
(45) Date of Patent: Mar. 1, 2022

(54) AGRICULTURAL ELEVATOR SUPPLIED BY MULTIPLE CROSS AUGERS

(71) Applicant: CNH Industrial America LLC, New Holland, PA (US)

(72) Inventors: Herbert M. Farley, Elizabethtown, PA (US); Cale N. Boriack, Lititz, PA (US); William M. McCully, Lancaster, PA (US); Denver R. Yoder, Manheim, PA (US); Pieter Vandevelde, Sint Michiels Brugge (BE); Clayton E. Banks, Brownstown, PA (US); Eric E. Veikle, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 587 days.

(21) Appl. No.: 16/152,721

(22) Filed: Oct. 5, 2018

(65) Prior Publication Data

US 2019/0037774 A1 Feb. 7, 2019

Related U.S. Application Data

(63) Continuation of application No. 15/526,755, filed as application No. PCT/US2015/060386 on Nov. 12, 2015, now Pat. No. 10,225,988.

(Continued)

(51) Int. Cl.
*A01F 12/46* (2006.01)
*A01D 61/00* (2006.01)
(Continued)

(52) U.S. Cl.
CPC ............. *A01F 12/46* (2013.01); *A01D 61/00* (2013.01); *A01D 61/002* (2013.01);
(Continued)

(58) Field of Classification Search
CPC ...... A01F 12/46; A01F 12/444; A01F 12/446; A01D 61/002; A01D 61/00
See application file for complete search history.

(56) References Cited

U.S. PATENT DOCUMENTS 2,433,162 A 12/1947 Scranton et al.
3,760,813 A 9/1973 Mathews
(Continued)

FOREIGN PATENT DOCUMENTS

DE 102008023005 A1 11/2009
DE 102008023022 A1 11/2009
(Continued)

OTHER PUBLICATIONS

International Search Report and Written Opinion for International Application No. PCT/US2015/060386, dated Feb. 1, 2016—9 pages.

*Primary Examiner* — Alicia Torres
(74) *Attorney, Agent, or Firm* — Patrick Sheldrake; Peter Zacharias

(57) ABSTRACT

An agricultural harvester includes a chassis, a cleaning system carried by the chassis, and a crop material elevator for receiving crop material that has passed through the cleaning system. The crop material elevator has a top-most end, a bottom-most end, a first inlet between the top-most end and the bottom-most end, and a second inlet between the top-most end and the first inlet. The agricultural harvester also includes an auger system for supplying crop material from the cleaning system to the crop material elevator. The auger system includes a first auger defining an auger axis for supplying crop material to the first inlet, a second auger defining a second auger axis, and a crop material conveyor for supplying crop material from the second auger to the second inlet.

17 Claims, 10 Drawing Sheets

Related U.S. Application Data

(60) Provisional application No. 62/079,927, filed on Nov. 14, 2014.

(51) Int. Cl.
*A01F 12/52* (2006.01)
*A01F 12/44* (2006.01)

(52) U.S. Cl.
CPC .......... *A01D 61/008* (2013.01); *A01F 12/444* (2013.01); *A01F 12/446* (2013.01); *A01F 12/52* (2013.01)

(56) References Cited

U.S. PATENT DOCUMENTS

| | | | |
|---|---|---|---|
| 4,338,770 A | 7/1982 | Schlueter | |
| 5,343,761 A * | 9/1994 | Myers | A01C 7/105 73/861 |
| 5,443,352 A | 8/1995 | Schuhmacher | |
| 5,863,247 A * | 1/1999 | Behnke | G01G 11/00 460/6 |
| 6,350,197 B1 | 2/2002 | Cooksey et al. | |
| 7,690,973 B2 | 4/2010 | Becker et al. | |
| 7,833,091 B2 | 11/2010 | Holtmann et al. | |
| 9,156,624 B2 | 10/2015 | Farley et al. | |
| 2009/0270147 A1 | 10/2009 | Becker et al. | |
| 2009/0280877 A1 | 11/2009 | Holtman et al. | |
| 2009/0290970 A1 | 11/2009 | Farley et al. | |
| 2012/0237325 A1 | 9/2012 | Flickinger et al. | |
| 2014/0169932 A1 | 6/2014 | Farley et al. | |
| 2014/0200057 A1 | 7/2014 | Farley et al. | |

FOREIGN PATENT DOCUMENTS

| | | |
|---|---|---|
| EP | 2798945 A1 | 11/2014 |
| FR | 2068084 A5 | 8/1971 |
| WO | 0158247 A1 | 8/2001 |

* cited by examiner

AGRICULTURAL ELEVATOR SUPPLIED BY MULTIPLE CROSS AUGERS

RELATED APPLICATION(S)

This application is a continuation under 35 U.S.C. § 120 of U.S. application Ser. No. 15/526,755, filed May 13, 2017, which is the United States national phase entry of International Application No. PCT/US2015/060386, filed Nov. 12, 2015, which claims the benefit of priority of U.S. Provisional Application No. 62/079,927, filed Nov. 14, 2014. The contents of U.S. application Ser. No. 15/526,755, International Application No. PCT/US2015/060386, and U.S. Provisional Application No. 62/079,927 are incorporated by reference herein in their entireties.

BACKGROUND OF THE INVENTION

1. Field of the Invention

The present invention relates to agricultural harvesters, and, more particularly, to agricultural harvesters equipped with elevators.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

As combines get larger, the cleaning systems and clean grain handling devices must grow in size to handle the additional throughput. One known device is described in U.S. Pat. No. 7,690,973 which includes a circuitous element to convey grain from two augers that are in the circuit. This configuration allows for the elevator to be fed with grain from two augers to increase the capacity, but the elevator housing shape is generally triangular. The generally triangular shape of the elevator housing is not ideal because it covers up service areas of the machine. U.S. Pat. No. 7,833,091 shows a similarly shaped elevator housing, which is not ideal for the same reasons.

What is needed in the art is a crop material elevator supply system that can handle an increased throughput of a combine with fewer disadvantages than known systems.

SUMMARY OF THE INVENTION

The present invention provides an auger system that provides crop material to a crop material elevator from a cleaning system. The auger system includes a first auger that supplies crop material to a first inlet of the crop material elevator and a second auger that provides crop material to a second inlet of the crop material elevator via a crop material conveyor that supplies the crop material to the second inlet generally transverse to the second auger.

The invention in one form is directed to an agricultural harvester that includes a chassis, a cleaning system carried by the chassis, a crop material elevator supplied with crop material that has passed through the cleaning system and has a first inlet and a second inlet, and an auger system supplying the crop material from the cleaning system to the crop material elevator. The auger system includes a first auger defining an auger axis that extends in a conveying direction toward the crop material elevator and is configured to supply crop material to the first inlet, a second auger defining a second auger axis that extends in the conveying direction, and a crop material conveyor configured to supply crop material from the second auger to the second inlet generally transverse to the second auger axis.

An advantage of the present invention is that it provides a way to increase the amount of crop material that is provided to the crop material elevator.

Another advantage is that the crop material elevator can have a mostly rectangular shape so that it does not cover up service areas of the agricultural harvester.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
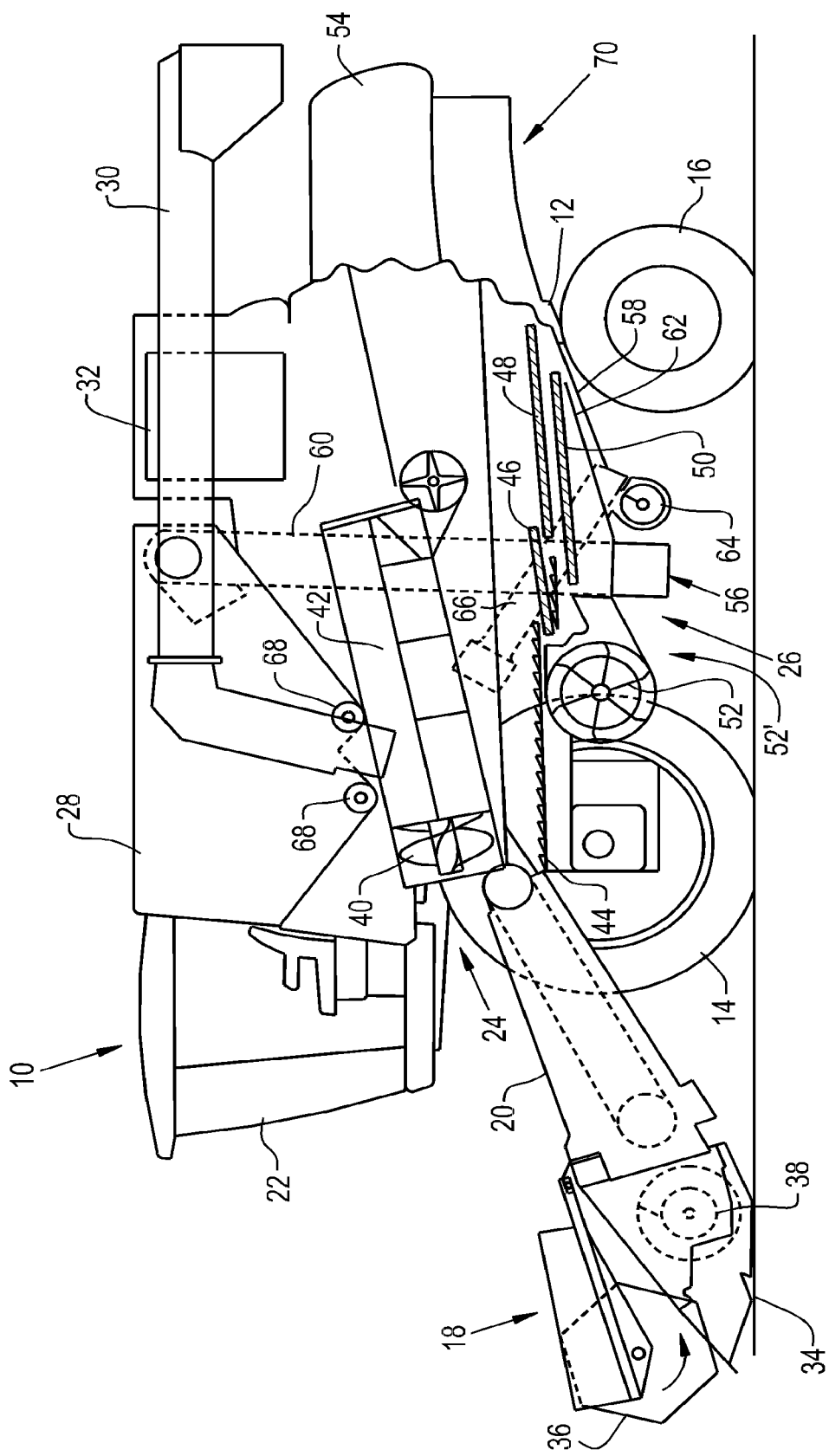
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are generally larger wheels, and rear wheels 16 are generally smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to an auger system 56, which is represented in FIG. 1 as a rectangular box for ease of illustrating its relative position on the combine 10, positioned crosswise below and in front of lower sieve 50. While the auger system 56 is described as conveying clean grain, it is contemplated that the auger system 56 can convey other types of crop material that pass through the cleaning system, such as material other than grain. Auger system 56 receives clean grain from each sieve 48, 50 and from bottom pan 62 of cleaning system 26. Auger system 56 conveys the clean grain laterally to a generally vertically arranged crop material elevator 60, which can also be referred to as a grain elevator when transporting clean grain, for transport to grain tank 28. It should be appreciated that while the crop material elevator 60 can be referred to as "a grain elevator", the crop material elevator 60 can also convey other types of crop material from the cleaning system 26, such as tailings. Tailings from cleaning system 26 fall to a tailings pan 58 and are subsequently delivered to tailings auger 64. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
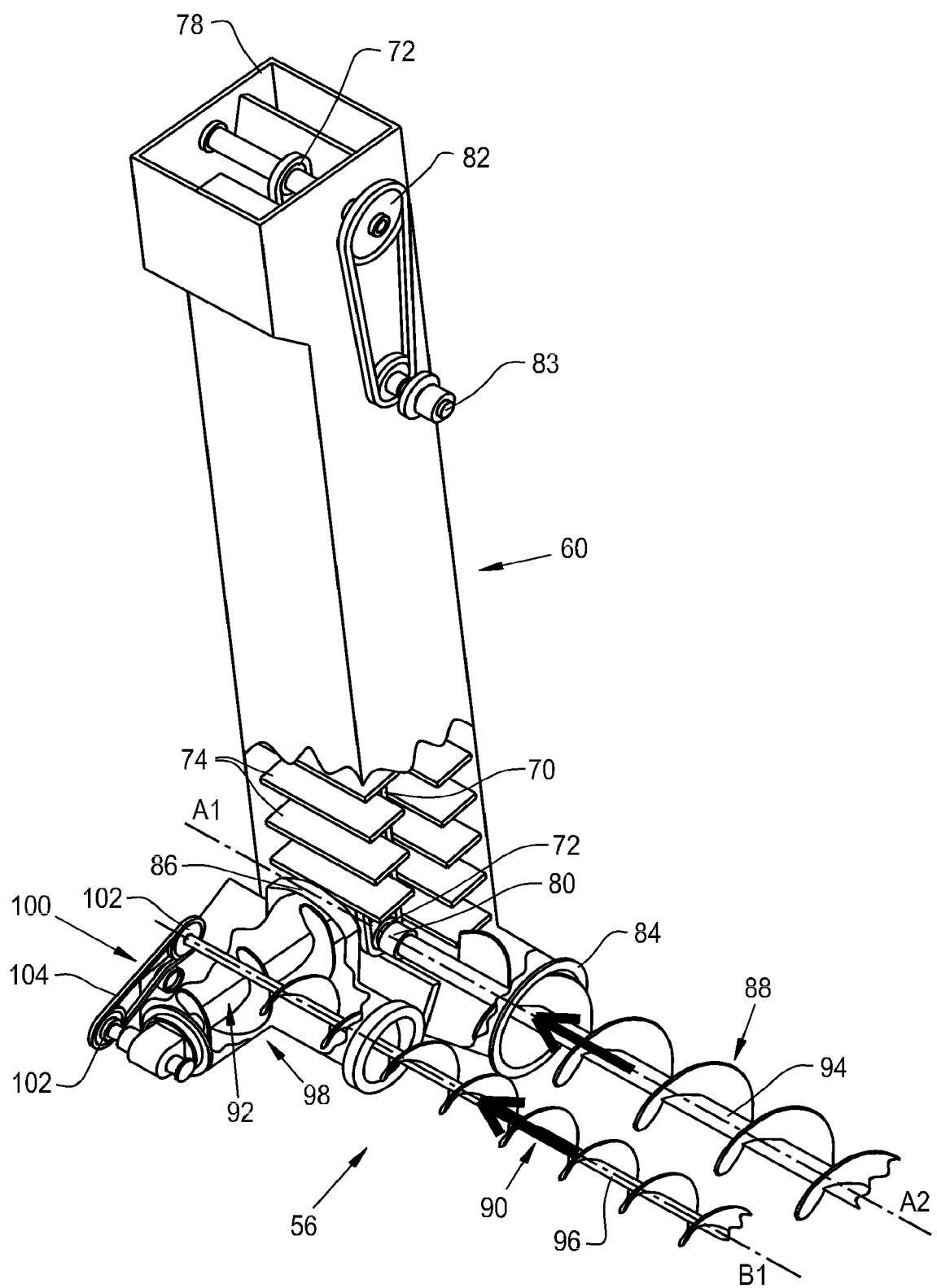
FIG. 2 is a perspective view of an embodiment of an auger system and crop material elevator of the agricultural harvester shown in FIG. 1 with portions cut away to show interior detail.
Figure 3:
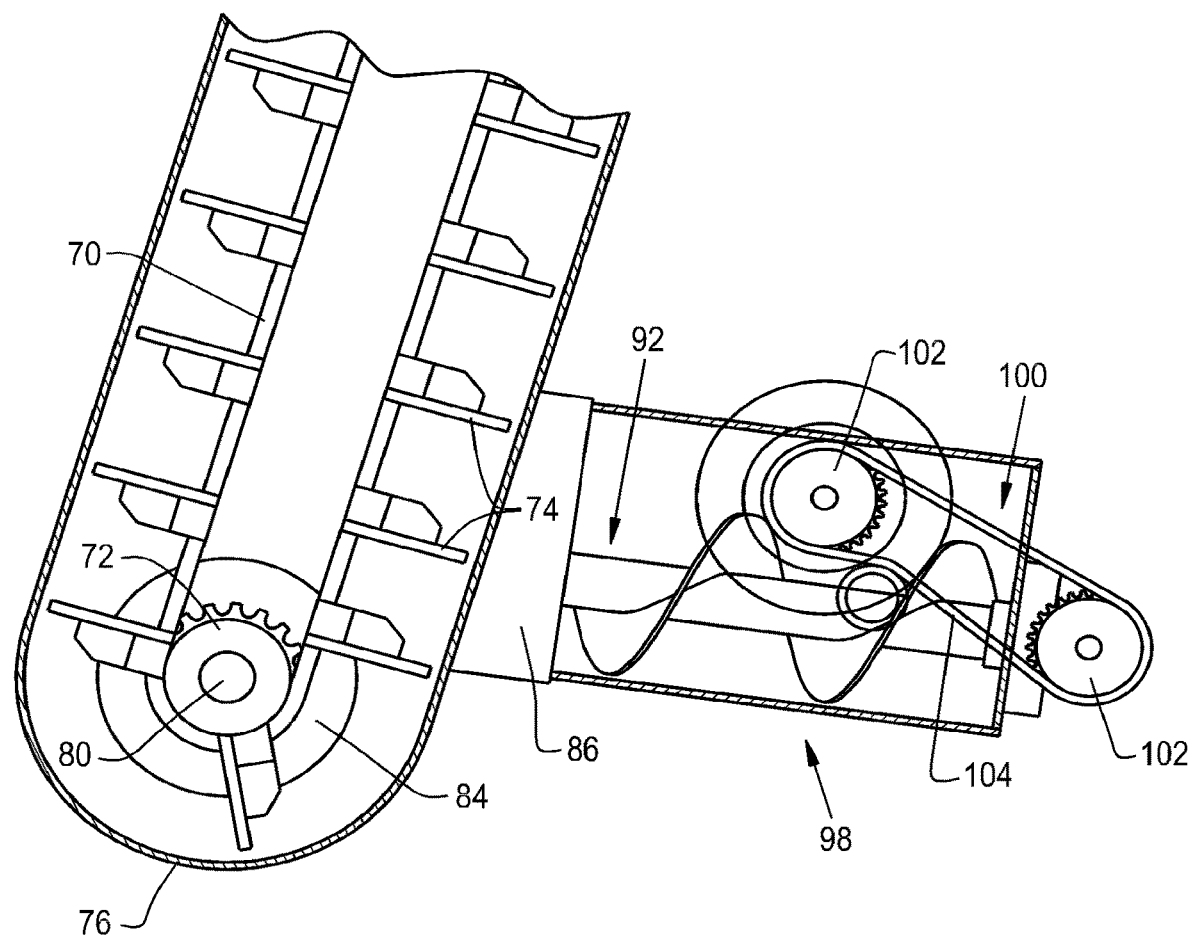
FIG. 3 is a sectional view of the auger system and crop material elevator shown in FIG. 2.
Figure 4:
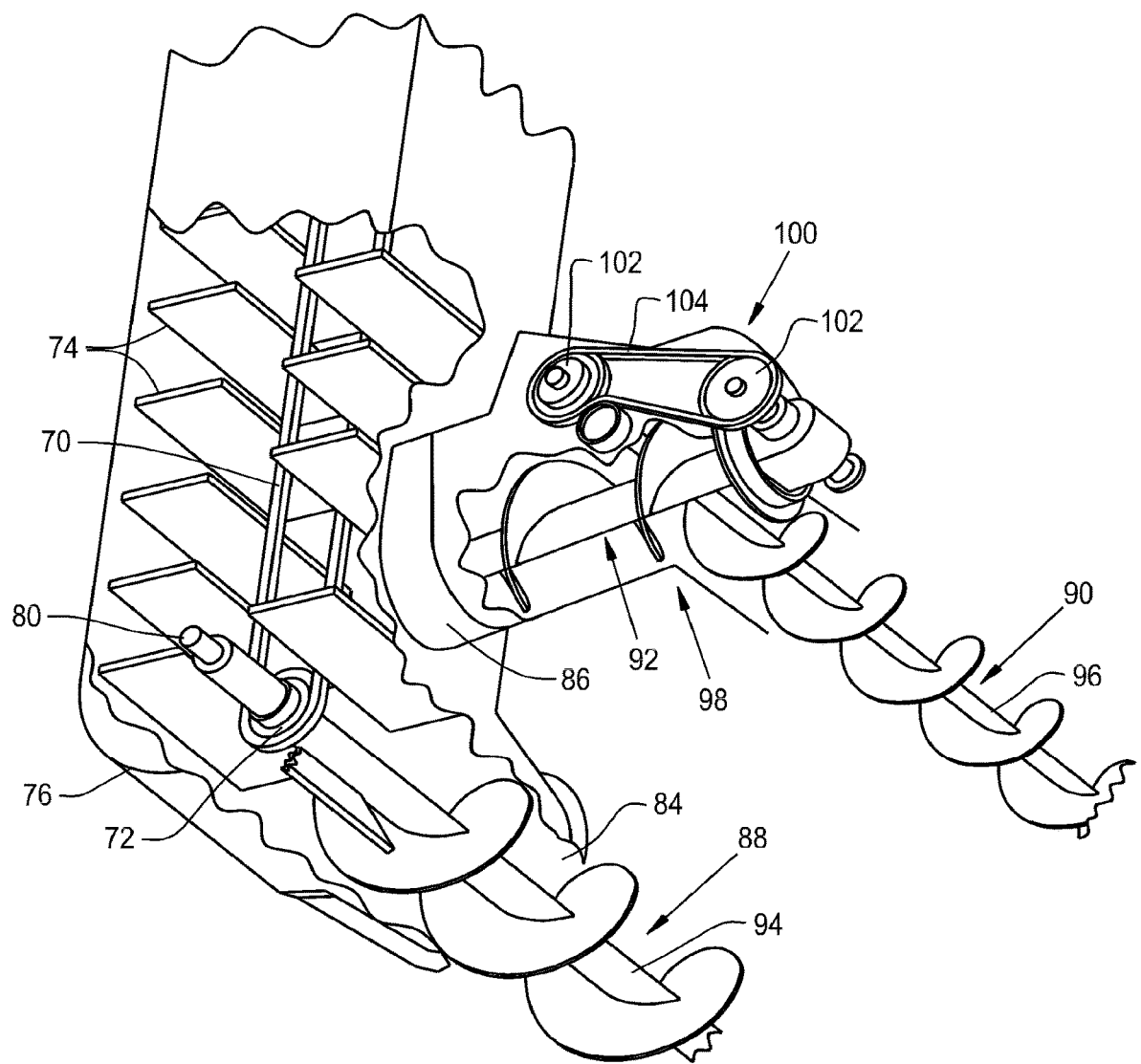
FIG. 4 is another perspective view of the auger system and crop material elevator shown in FIGS. 2-3 with portions cut away to show interior detail.

Referring now to FIGS. 2-4, an embodiment of the auger system 56 and grain elevator 60 are shown in better detail. As can be seen, the grain elevator 60 can include a driving loop 70 rotated by sprockets 72. Paddles 74 are connected to the driving loop 70 to elevate grain from a bottom 76 of the grain elevator 60 toward a top 78 of the grain elevator 60. The grain elevator 60 can include a lower axle 80 near the bottom 76 that defines an axle axis A1 and an upper axle 82 located near the top 78. The grain elevator 60 can also have more than two axles 80, 82, such as additional axle 83 located between the lower axle 80 and upper axle 82. The lower axle 80 and upper axle 82 can transmit rotational force to the sprockets 72 to drive the driving loop 70 and connected paddles 74, causing the paddles 74 to rotate through the grain elevator 60. The grain elevator 60 has a first inlet 84 and a second inlet 86 where crop material is supplied to the grain elevator 60 from the cleaning system 26 via the auger system 56, which will be described further below. As can be seen, the first inlet 84 can be located adjacent the lower axle 80 and the second inlet 86 can be located between lower axle 80 and upper axle 82.

The auger system 56 includes a first auger 88 that defines an auger axis A2 extending in a conveying direction, represented as an arrow placed on A2, toward the crop material elevator 60 and supplies crop material to the first inlet 84 of the grain elevator 60, a second auger 90 that defines a second auger axis B1 extending in the conveying direction, represented as an arrow on B1, and a crop material conveyor 92, shown here as a cross auger, that supplies crop material from the second auger 90 to the second inlet 86 generally transverse to the second auger axis B1. One or both of the augers 88, 90 can be fixedly attached to the agricultural harvester 10. As can be seen, the auger axis A2 and second auger axis B1 are also generally parallel to one another. As used herein, the term "generally," when used in the context of "generally parallel" signifies that the relationships are mostly parallel, but may deviate from completely parallel by 1 to 3 degrees. It should be appreciated that the conveying direction referenced herein refers to a single dimension directed away from the cleaning system 26 toward the grain elevator 60, but the augers 88, 90 can extend along their respective axes in one or two dimensions toward the grain elevator 60 or in a dimension away from the grain elevator 60. For example, one or both of the augers 88, 90 can be a self-adjusting auger that adjusts its overall conveying direction away from the cleaning system 26 up or down relative to the ground, but still extends in a conveying direction toward the grain elevator 60. In this sense, the augers 88, 90 do not need to extend in the same overall conveying direction as each other, but can have a dimensional component of their overall conveying directions that are different. The cross auger 92 extends generally transverse to the second auger axis B1 in the sense that an axis defined by the cross auger 92 would intersect the second auger axis B1 if the second auger axis B1 were located on the same plane as the axis defined by the cross auger 92. The first auger 88 and second auger 90 can have differing structures, as shown, or can have identical structures. As can be seen, the first auger 88 is rotated about a first auger axle 94 and the second auger 90 is rotated about a second auger axle 96. The first inlet 84 and second inlet 86 can be sized and shaped in any manner that allows for crop material to be pushed into the grain elevator 60 from the first auger 88 and the cross auger 92, respectively.

The first auger 88 and first auger axle 94 can be aligned or parallel with the axle axis A1 of lower axle 80. As shown, the first auger 88 supplies crop material to the first inlet 84 proximate to the lower axle 80, i.e., in close spatial proximity, so that the first auger axle 94 can be linked to the lower axle 80. The first auger axle 94 could also be linked to the lower axle 80 if the auger axis A2 extends parallel to the axle axis A1. Such a configuration can allow for the lower sprocket 72 to be rotated by the first auger axle 92 to drive the driving loop 70 and connected paddles 74. By linking the rotation of the lower sprocket 72 to the rotation of the first auger axle 94, the rotational speed and conveyance rate of crop material by the paddles 74 can be linked to the rotational speed and conveyance rate of crop material by the first auger 88. This linking allows for the conveyance rate of crop material by the paddles 74 to be automatically adjusted in response to an adjustment of the rotational speed of the first auger axle 94. The first auger axle 94 and the lower axle 80 of the grain elevator 60 can also be kept independent of one another so that the rotational speed and direction of each can be independently adjusted. The first auger axle 94 can, for example, be driven by connection to a mechanical system (not shown) of the combine 10 that provides the first auger axle 94 with rotational energy. To allow for independent adjustment of the rotational speed and direction of the first auger axle 94 and lower axle 80 of the grain elevator 60, the first auger axle 94 can be driven by a different element than the lower axle 80.

Figure 8:
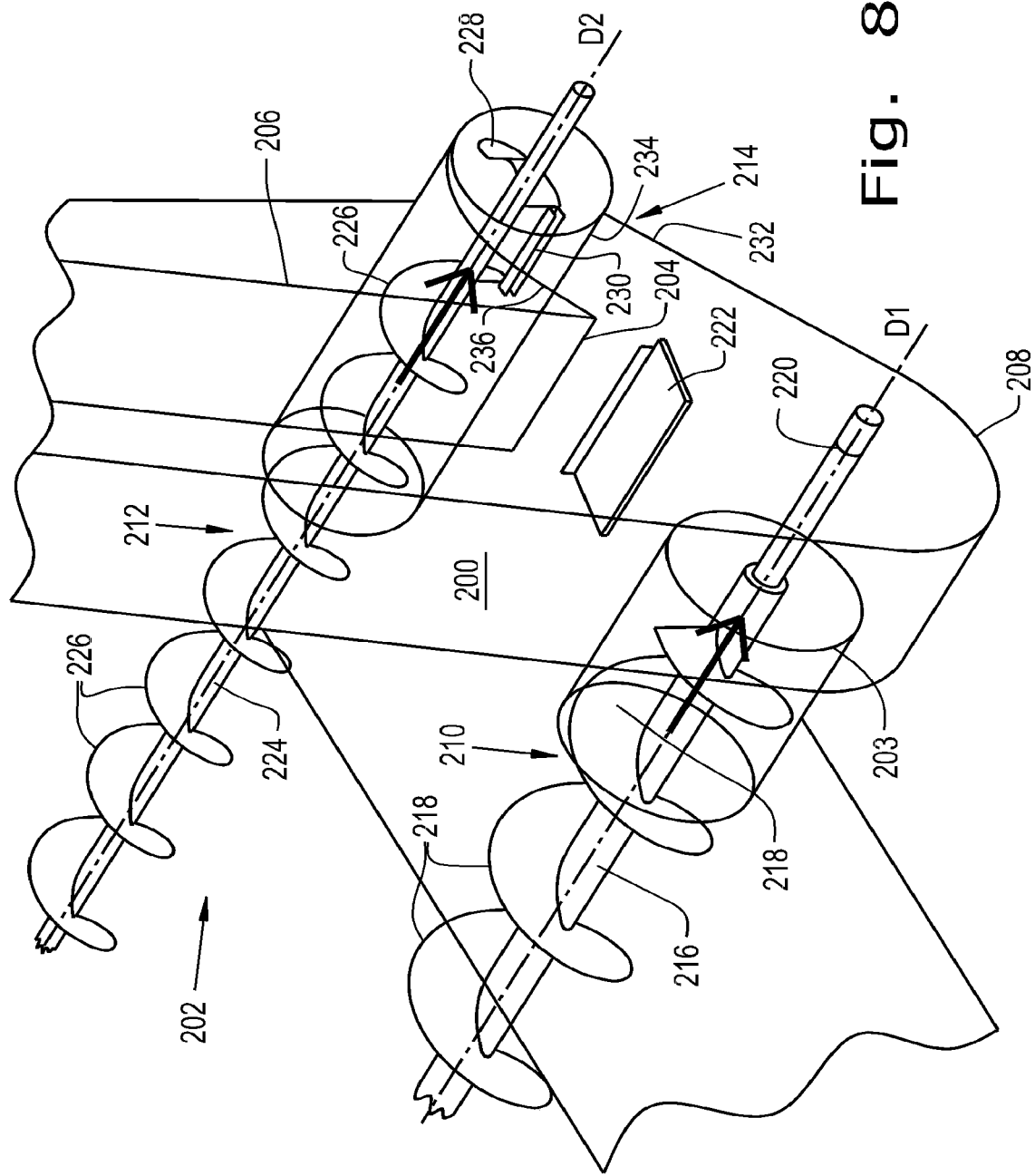
FIG. 8 is a perspective view of yet another embodiment of an auger system and crop material elevator according to the present invention with portions cutaway to show interior detail.
Figure 9:
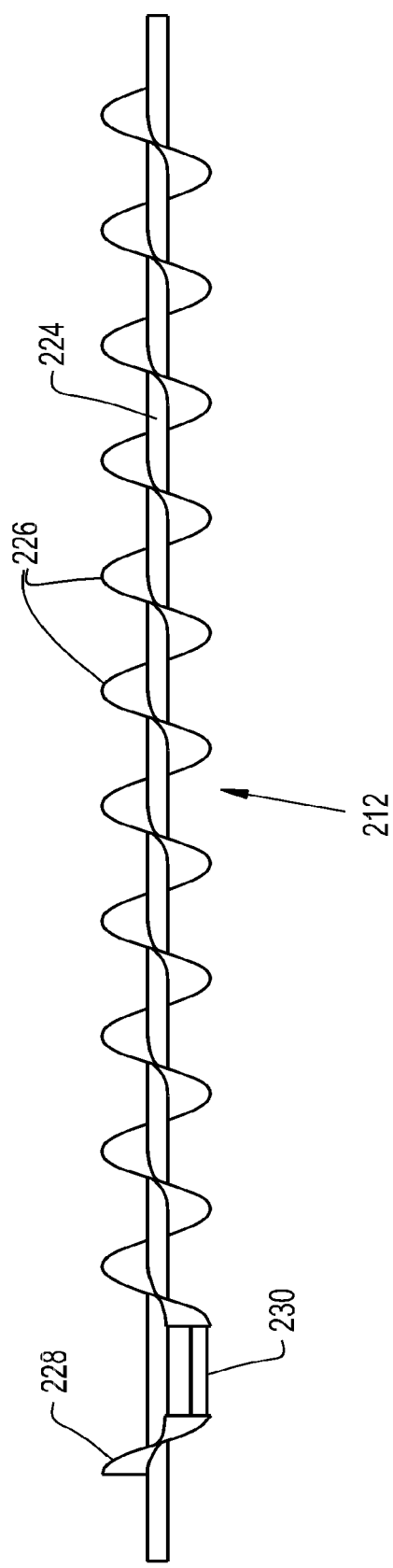
FIG. 9 is a side view of portions of the second auger and crop material conveyor shown in FIG. 8.
Figure 10:
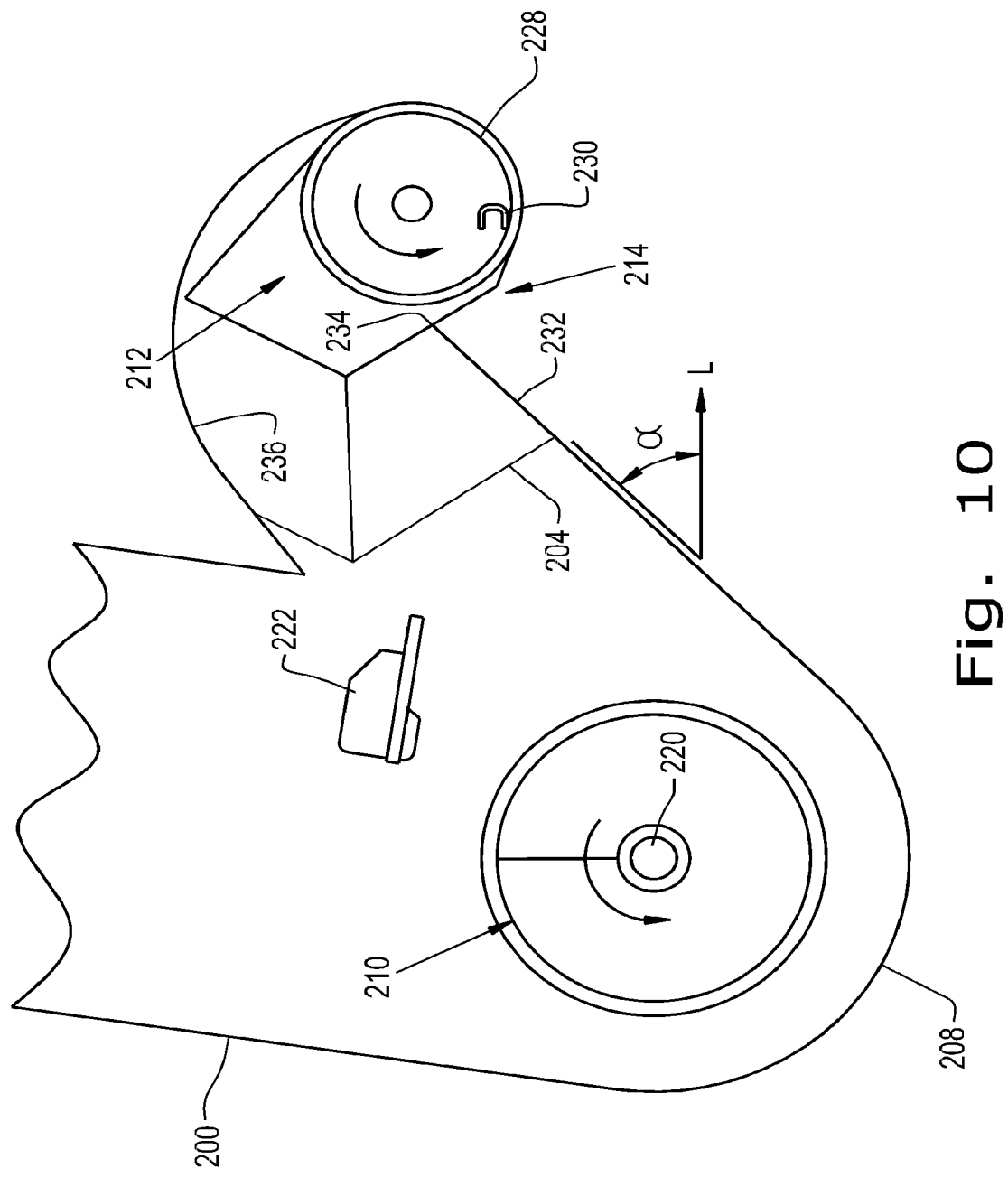
FIG. 10 is a sectional view of the auger system and crop material elevator shown in FIG. 8.

The second auger 90 and second auger axle 96 extend along the second auger axis B1 parallel to the auger axis A2 and are shown as being independent of the first auger 88 and first auger axle 94, i.e., the second auger 90 and second auger axle 96 can have a different rotational speed and direction than the first auger 88 and first auger axle 94. This allows for the second auger 90 to be constantly running independently of the first auger 88 or to selectively run when the throughput of crop material through the cleaning system 26 is high and the first auger 88 is not capable of supplying the cleaned crop material to the grain elevator 60 at a sufficient rate. Independent running of the first auger 88 and second auger 90 allows for different and separately adjustable conveyance rates of crop material by the augers 88 and 90. As shown, the second auger 90 extends to a feeding area 98 where crop material from the second auger 90 is fed to the cross auger 92, which will then supply the crop material to the second inlet 86 of the grain elevator 60 to be conveyed by the paddles 74 up the grain elevator 60. The cross auger 92 extends generally transverse to the auger axis A2 and second auger axis B1, so the cross auger 92 also extends generally transverse to the lower axle 80 of the grain elevator 60. The cross auger 92 can be structurally different than the second auger 90, as shown, or can be structurally identical. The second auger axle 96 can drive the cross auger 92 through a linking mechanism 100 which includes one or more gears 102 and a flexible power transmission 104. The linking mechanism 100 allows for the rotational speed of the cross auger 92 to be automatically linked to the rotational speed of the second auger axle 96 so that the conveyance rate of crop material by the cross auger 92 is linked to the conveyance rate of crop material by the second auger 90. The linking mechanism 100 can be constructed so that the rotational speed of the cross auger 92 matches or does not match the rotational speed of the second auger 90, as desired. As shown, the gears 102 of the linking mechanism 100 have roughly the same diameter, so that the rotational speed of the second auger 90 can approximately match the rotational speed of the cross auger 92. The second auger axle 96 can be driven by connection to the mechanical system of the combine 10 that provides the second auger axle 96 with rotational energy. While the crop material conveyor 92 is shown as a cross auger in FIGS. 2-4, the crop material conveyor 92 could be other types of constructions that allow for crop material to be supplied to the second inlet 86 such as a belt conveyor or scoops. One such alternate embodiment of a crop material conveyor is shown in FIGS. 8-10 and will be described further below. It should be appreciated that the crop material conveyor does not need to be an active element that draws power from the agricultural harvester 10, but could also be an inactive element such as a sloped surface directed toward the second inlet 86 that takes advantage of forces such as gravity to supply crop material to the second inlet 86.

Figure 5:
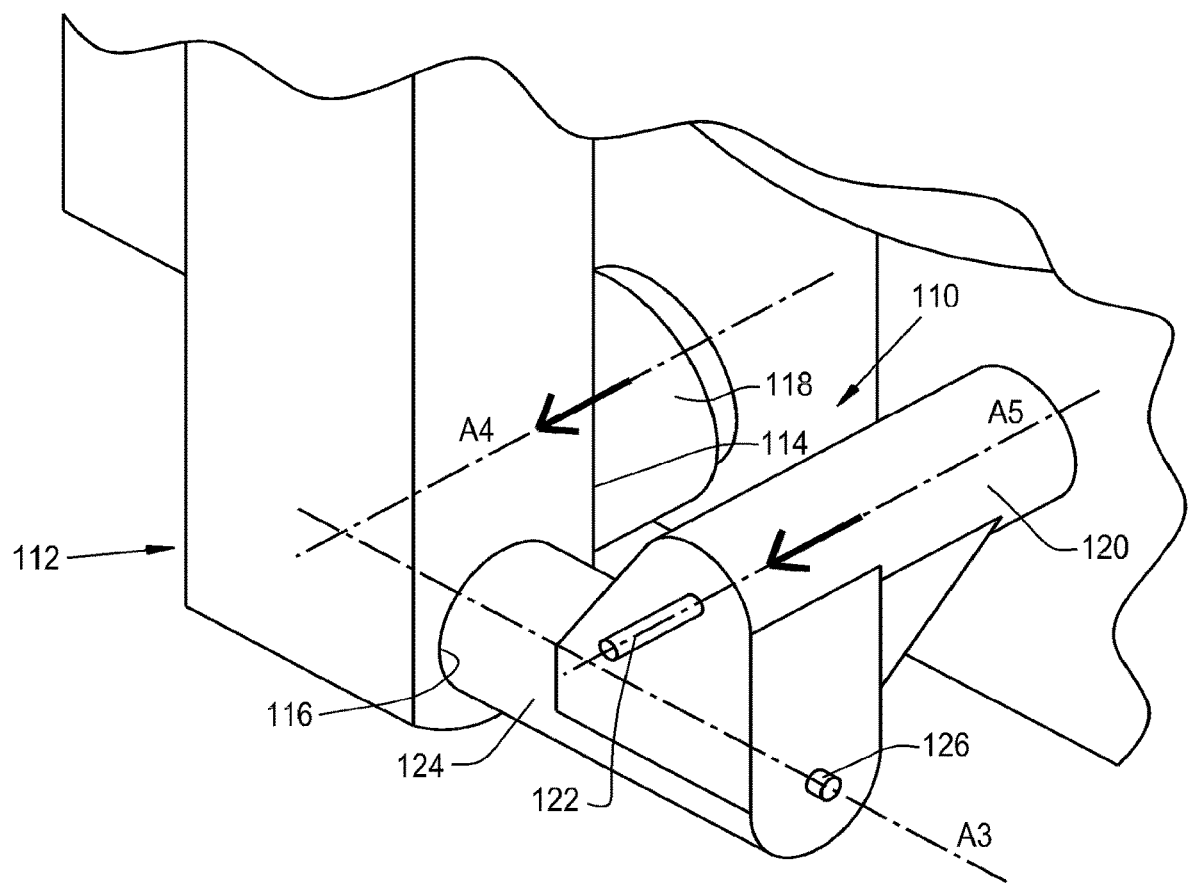
FIG. 5 is a perspective view of another embodiment of an auger system and crop material elevator according to the present invention.

Referring now to FIG. 5, another embodiment of an auger system 110 and grain elevator 112 according to the present invention is shown that can be included in the combine 10 shown in FIG. 1 or a different agricultural harvester. The grain elevator 112 shown in FIG. 5 is similar to the grain elevator 60 shown in FIGS. 2-4, but is rotated 90 degrees so that a first inlet 114 of the grain elevator 112 is formed transversely to a lower axle (not shown) that extends along an axle axis A3 of the grain elevator 112 and a second inlet 116 of the grain elevator 112 is formed parallel to the axle axis A3 or proximate to the lower axle.

The auger system 110 includes a first auger 118 that supplies crop material to the first inlet 114 of the grain elevator 112 and defines an auger axis A4 extending in a conveying direction, represented as an arrow on A4, toward the grain elevator 112, a second auger 120 that rotates about a second auger axle 122 that defines a second auger axis A5 extending in the conveying direction, represented as an arrow on A5, and a crop material conveyor 124, shown as a cross auger which rotates about a cross auger axle 126 that is aligned with the axle axis A3 of the grain elevator 112 and extends generally transverse to the second auger axis A5. As can be seen, the auger axis A4 and second auger axis A5 are generally parallel to one another, such that the cross auger extends generally transverse to the auger axis A4 as well. The second auger 120 can convey crop material from the cleaning system 26 to a feeding area where the crop material then drops down to the cross auger 124. The cross auger 124 then supplies the crop material to the second inlet 116 of the grain elevator 112. Although not shown, the auger system 110 can include a linking mechanism, similar to the linking mechanism 100 shown in FIGS. 2-4, that links the second auger axle 122 to the cross auger axle 126 so that the rotational speed and conveyance rate of the second auger 120 and cross auger 124 can be linked together. Alternatively, the lower axle of the grain elevator 112 can be driven by rotation of a driving loop (not shown) that is driven by an upper axle (not shown) of the grain elevator 112, with the cross auger axle 126 being linked to the lower axle so that the conveyance rate and rotational speed of the cross auger 124 depends on the rotational speed of the lower axle and upper axle of the grain elevator 112. As previously described, the first auger 118 and second auger 120 can be driven independently of one another to allow for the second auger 120 to be constantly driven independently of the first auger 118 or selectively driven during a high throughput of the combine harvester 10. The first auger 118 and second auger 120 being driven independently allows for differing conveyance rates of crop material by the first auger 118 and second auger 120, which can be useful in certain situations.

Figure 6:
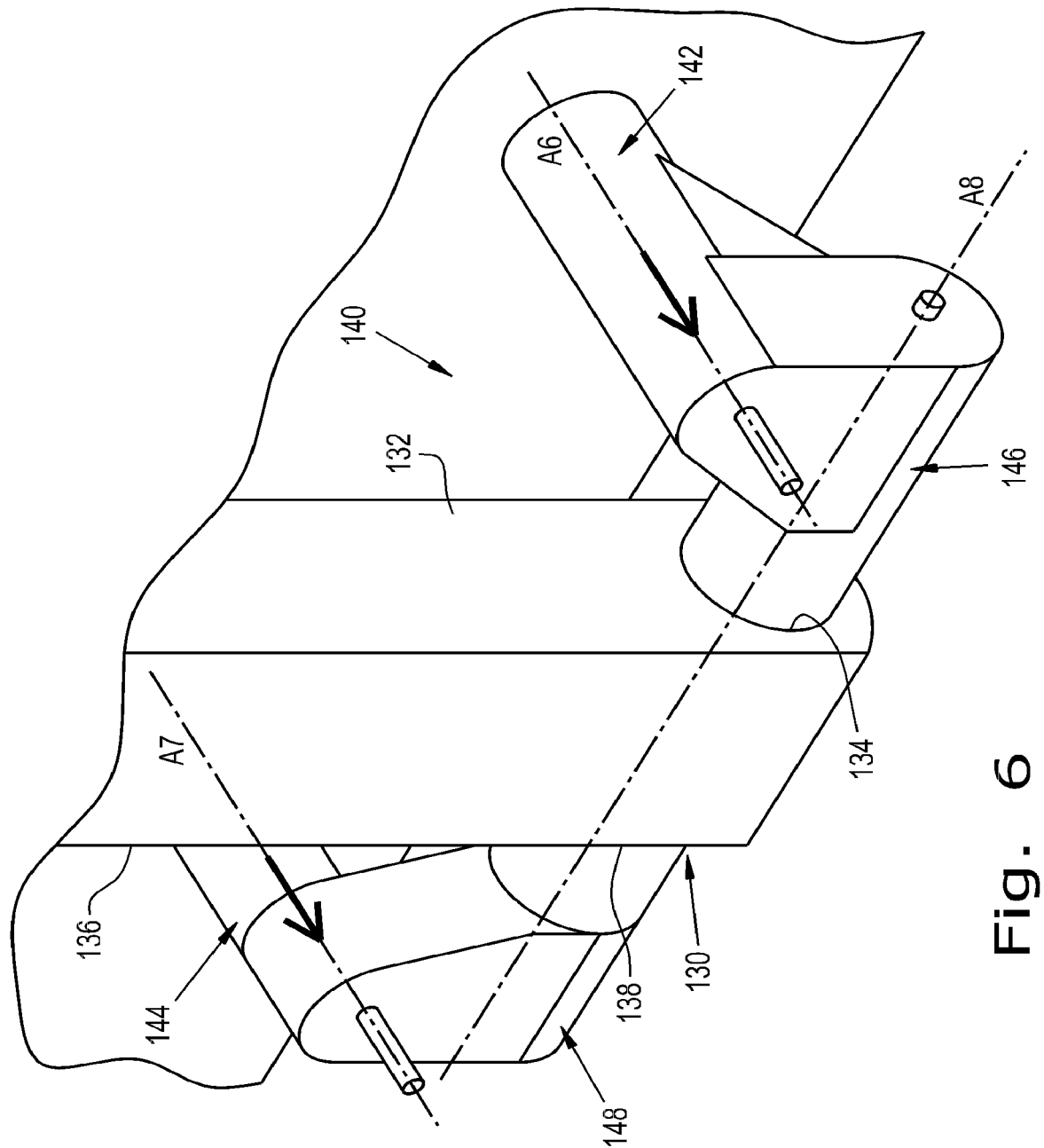
FIG. 6 is a perspective view of yet another embodiment of an auger system and crop material elevator according to the present invention.

According to another embodiment of the present invention and referring now to FIG. 6, the agricultural harvester 10 can be equipped with a crop material elevator 130 having a first side 132 where a first inlet 134 is located and a second side 136 opposed to the first side 132 where a second inlet 138 is located. The crop material elevator 130 is supplied with clean crop material by an auger system 140. The auger system 140 includes a first auger 142 that defines an auger axis A6 extending in a conveying direction, represented as an arrow on A6, toward the crop material elevator 130 and a second auger 144 that defines a second auger axis A7 extending in the conveying direction, represented as an arrow on A7. As can be seen, the auger axis A6 and second auger axis A7 are generally parallel to each other. A crop material conveyor 146, shown as a cross auger, supplies crop material from the first auger 142 to the first inlet 134 generally transverse to the auger axis A6. Another crop material conveyor 148, shown as a cross auger, supplies crop material from the second auger 144 to the second inlet 138 generally transverse to the second auger axis A7. As shown, the crop material elevator 130 has an orientation similar to the elevator 112 shown in FIG. 5. In this respect, the first side 132 of the crop material elevator 130 can be referred to as a front side of the crop material elevator 130 and the second side 136 of the crop material elevator 130 can be referred as a back side of the crop material elevator 130, with the crop material elevator 130 being supplied with crop material from both sides 132, 136 by the cross augers 146 and 148. In such a configuration, the cross augers 146 and 148 can extend generally parallel or proximate to a lower axle (not shown) defining an axle axis A8 of the grain elevator 130. While the crop material conveyors 146 and 148 are shown as cross augers supplying crop material to the crop material elevator 130 from the augers 142 and 144, other types of crop material conveyors could also be used according to the present invention, as previously described.

Figure 7:
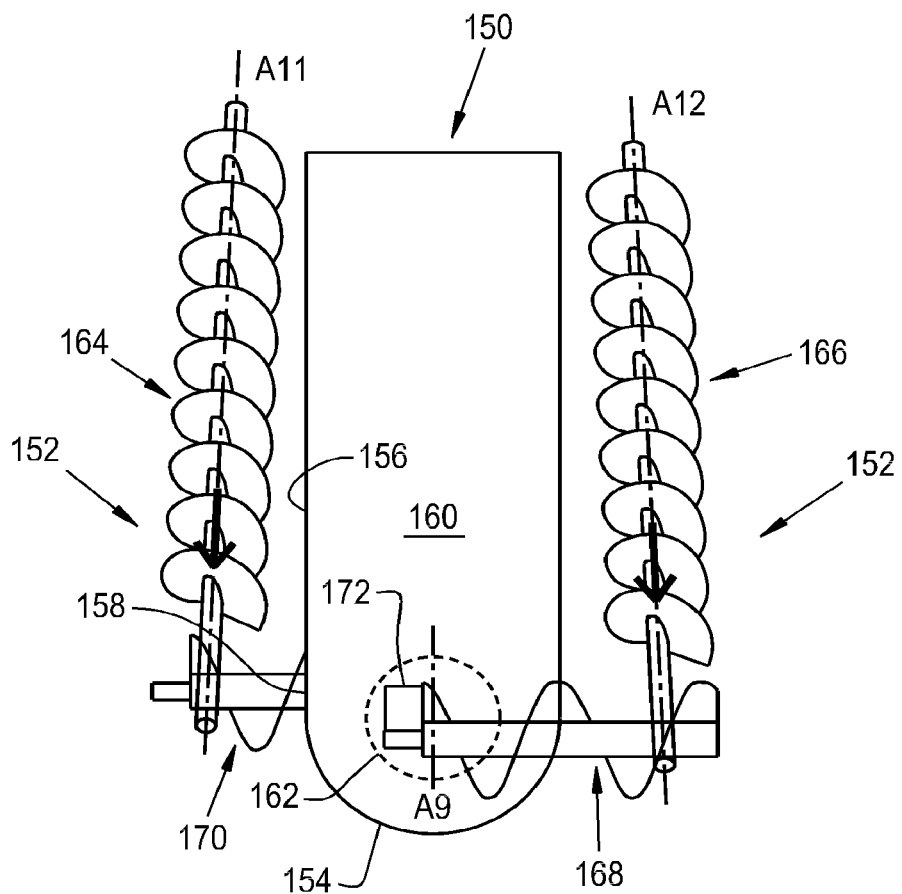
FIG. 7 is a perspective view of yet another embodiment of an auger system and crop material elevator according to the present invention.

According to another embodiment of the present invention and referring now to FIG. 7, the agricultural harvester 10 can include a crop material elevator 150 supplied with clean crop material by an auger system 152. As can be seen, the crop material elevator 150 includes a lower axle (not shown) that defines an axle axis A9 and which rotates elevator paddles (not shown) from a bottom 154 of the crop material elevator 150 toward a top (not shown), similar to previously described crop material elevators. The crop material elevator 150 has a first surface 156 that defines a plane extending generally parallel to the axle axis A9 with a first inlet 158 and a second surface 160 that defines a plane extending generally transverse to the axle axis A9 with a second inlet 162. The crop material elevator 150 is supplied with crop material from the cleaning system 26 through the first inlet 158 and second inlet 162 via auger system 152, which is further described below.

The auger system 152 includes a first auger 164 that defines a first auger axis A11 extending in a conveying direction, represented as an arrow on A11, toward the crop material elevator 150, a second auger 166 that defines a second auger axis A12 extending in the conveying direction, represented as an arrow on A12, a first crop material conveyor 168, shown as a first cross auger, supplying crop material from the second auger 166 to the second inlet 162 of the crop material elevator 150, and a second crop material conveyor 170, shown as a second cross auger, supplying crop material from the first auger 164 to the first inlet 158 of the crop material elevator 150. Two reference numerals 152 are shown in FIG. 7 to illustrate that the auger system 152 encompasses the previously described components shown in FIG. 7, not that there are two separate auger systems. While the second crop material conveyor 170 is shown as a second cross auger, the second crop material conveyor 170 could be configured as other types of crop material conveyors previously described. As can be seen, the first auger 164 and second auger 166 can be structured differently but could also be structured identically, if desired. The first auger 164 and second auger 166 can be driven independently, i.e., with different rotational speeds or directions. As can be seen, auger axis A11 and second auger axis A12 are generally parallel to each other.

The first cross auger 168 extends generally transverse to the second auger axis A12 to supply crop material to the second inlet 162 and the second cross auger 170 extends generally transverse to the first auger axis A11 to supply crop material to the first inlet 158. In this respect, the first cross auger 168 and second cross auger 170 extend generally parallel to one another. The second cross auger 170 can be linked to the first auger 164 so that the rotational speed and direction of the second cross auger 170 depends on the rotational speed and direction of the first auger 164 and the first cross auger 168 can be linked to the second auger 166 so that the rotational speed and direction of the first cross auger 168 depends on the rotational speed and direction of the second auger 166. A linking mechanism, such as linking mechanism 100 described above, can be used to link the second cross auger 170 to first auger 164 and to link the first cross auger 168 to second auger 166. As shown, the second cross auger 170 is directed through the first inlet 158 so that crop material from the cleaning system 26 can be moved by the first auger 164 to the second cross auger 170 and by the second cross auger 170 into the crop material elevator 150 through the first inlet 158. The first cross auger 168 is directed parallel to the second surface 160 with second inlet 162, so that crop material from the cleaning system 26 provided to the first cross auger 168 by the second auger 166 has to be directed into the second inlet 162 by a directing mechanism 172, such as a curved wall directed toward the second inlet 162 or other structural feature that will direct the crop material conveyed by the first cross auger 168 into the second inlet 162. An example of such a mechanism could also be a reverse fighting on the first cross auger 168, which is described below and shown in FIGS. 8-10.

As previously described, the crop material conveyor according to the present invention can be a construction besides an auger. According to another embodiment of the present invention and referring now to FIGS. 8-10, the agricultural harvester 10 can include a crop material elevator 200 supplied with crop material from the cleaning system 26 of the agricultural harvester 10 by an auger system 202. The crop material elevator 200 includes a first inlet 203 and a second inlet 204. As can be seen, the second inlet 204 can extend from a front wall 206 of the crop material elevator 200 to a bottom 208 of the crop material elevator 200.

The auger system 202 includes a first auger 210 defining an auger axis D1 extending in a conveying direction, represented as an arrow on D1, toward the crop material elevator 200 and supplying crop material to the first inlet 203 of the crop material elevator 200, a second auger 212 defining a second auger axis D2 extending in the conveying direction, represented as an arrow on D2, and a crop material conveyor 214 supplying crop material from the second auger 212 to the second inlet 204 generally transverse to the second auger axis D2. As can be seen, the auger axis D1 and second auger axis D2 are generally parallel to each other. The first auger 210 includes a first auger axle 216 extending along auger axis D1 with first auger flightings 218 wrapped around the first auger axle 216. The first auger flightings 218 can be formed as an integral piece with the first auger axle 216 or otherwise connected to the first auger axle 216, such as by welding, so that the first auger flightings 218 are rotated by the first auger axle 216 to move crop material along the first auger 210 in the conveying direction and to the first inlet 203. As shown, the first auger axle 216 is aligned and connected with an elevator axle 220 that rotates one or more elevator paddles 222 from the bottom 208 of the crop material elevator 200 toward a top (not shown) of the crop material elevator 200. In this configuration, the elevator axle 220 is directly linked with the first auger axle 216 so that rotation of the elevator paddles 222 through the crop material elevator 200 can be automatically adjusted by adjusting the rotational speed or direction of the first auger axle 216. The elevator axle 220 could also be linked with the first auger axle 216 by a linking mechanism, such as previously described linking mechanism 100, if the elevator axle 220 is not directly connected to the first auger axle 216. The elevator axle 220 could also be driven independently of the first auger axle 216, as previously described.

The second auger 212 includes a second auger axle 224 that extends along the second auger axis D2 and second auger flightings 226 wrapped around the second auger axle 224. The second auger flightings 226 can be formed as an integral piece with the second auger axle 224 or otherwise connected to the second auger axle 224, such as by welding, so that the second auger flightings 226 are rotated by the second auger axle 224 to move crop material toward the crop material conveyor 214. As can be seen, the first auger axle 216 and second auger axle 224 and first auger flightings 218 and second auger flightings 226 can be configured differently from each other to provide different conveyance rates of crop material by the first auger 210 and second auger 212. As shown, the second auger 212 is placed above the first auger 210, relative to the bottom 208 of the crop material elevator 200, but the second auger 212 and first auger 210 could also be placed at the same height relative to the bottom 208.

The crop material conveyor 214 supplies crop material from the second auger 212 to the second inlet 204. As shown, the crop material conveyor 214 includes a conveyor fighting 228, a bar 230 connecting the conveyor flighting 228 to the second auger flightings 226, and a sloped surface 232 that is directed toward the second inlet 204. While the conveyor fighting 228 is shown as a half pitch of fighting that is directly linked to the rotation of the second auger axle 224 by bar 230, the conveyor fighting 228 can also rotate independently of the second auger axle 224 to direct crop material toward the second inlet 204. The conveyor flighting 228, as shown, is a half pitch of flighting that is formed with an opposite helical direction relative to the second auger flightings 226, i.e., the conveyor fighting 228 can be formed as right hand helix flighting when the second auger flightings 226 are formed as left hand helix fighting, or vice versa. The conveyor flighting 228 pushes material away from the end wall in the axial direction of conveyance along the second auger axis D2 while the bar 230 directs the crop material transversely to the second auger axis D2 toward the second inlet 204. The crop material that is thrown by the crop material conveyor 214 is directed toward the second inlet 204 and can travel down the sloped surface 232 toward the second inlet 204 when the second auger 212 is located above the second inlet 204 relative to the bottom 208 of the crop material elevator 200. The crop material conveyor 214 can also throw the crop material directly into the second inlet 204, eliminating the need for the sloped surface 232.

As can be seen in FIG. 10, the sloped surface 232 can form a slope angle $\alpha$ relative to a line L drawn transversely to the auger axis D1, which extends into the page. It is useful if the slope angle $\alpha$ is greater than a slope value that allows for crop material to stagnate between the second auger 212 and the second inlet 204, with values above 25 degrees being example values. As shown, the sloped surface 232 has a slope angle α of approximately 46 degrees which corresponds to an edge 234 of the sloped surface 232 being approximately the same height as the second auger axle 224, relative to the bottom 208 of the crop material elevator 200. Other values for the slope angle α could also be chosen, with exemplary values being between 30 and 55 degrees. Once the crop material conveyor 214 throws the crop material onto the sloped surface 232, the crop material slides down the sloped surface 232 into the crop material elevator 200 through the second inlet 204 toward the bottom 208 of the crop material elevator 200, where the crop material will be conveyed toward the top of the crop material elevator 200 by elevator paddle 222. In this sense, the sloped surface 232 should be sufficiently close to the conveyor fighting 228 so that crop material thrown by the conveyor fighting 228 hits the sloped surface 232 to travel into the crop material elevator 200 through the second inlet 204 and does not spill out of the agricultural harvester 10. The crop material conveyor 214 can also have a curved wall 236 that connects to the second auger 212 housing adjacent to the conveyor flighting 228 to direct crop material that is forcefully thrown into the air down toward the sloped surface 232. It should be appreciated that the sloped surface 232 alone could also be the crop material conveyor if, for example, the second auger 212 conveyed crop material down to the sloped surface 232 through an opening formed in the second auger 212, utilizing gravity, to allow the crop material to slide down the sloped surface 232 and be supplied to the second inlet 204. Such an embodiment would be an example of the crop material conveyor being an inactive element that did not draw power from the agricultural harvester 10 to operate.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    a chassis;
    a cleaning system carried by the chassis;
    a crop material elevator for receiving crop material that has passed through the cleaning system, the crop material elevator comprising:
        a top-most end;
        a bottom-most end opposite the top-most end;
        a first inlet between the top-most end and the bottom-most end; and
        a second inlet between the top-most end and the first inlet; and
    an auger system for supplying crop material from the cleaning system to the crop material elevator, the auger system comprising:
        a first auger defining an auger axis for supplying crop material to the first inlet;
        a second auger defining a second auger axis; and
        a crop material conveyor for supplying crop material from the second auger to the second inlet;
    wherein the second auger is located above the second inlet.

2. The agricultural harvester of claim 1, wherein the crop material elevator comprises an upper axle in proximity to the top-most end and a lower axle in proximity to the bottom-most end.

3. The agricultural harvester of claim 2, wherein the first inlet is adjacent the lower axle, and the second inlet is between the lower axle and the upper axle.

4. The agricultural harvester of claim 2, wherein the lower axle defines an axle axis that is generally transverse to the auger axis.

5. The agricultural harvester of claim 2, wherein the lower axle defines an axle axis that is aligned with the second inlet.

6. The agricultural harvester of claim 1, wherein the crop material elevator comprises a sloping surface descending from the second inlet toward the bottom-most end of the crop material elevator.

7. The agricultural harvester of claim 6, wherein the crop material conveyor comprises a sloped surface directed toward the second inlet.

8. The agricultural harvester of claim 7, wherein the crop material conveyor comprises a curved wall for directing crop material toward the sloped surface.

9. The agricultural harvester of claim 7, wherein the sloping surface and sloped surface are sloped at an angle α.

10. The agricultural harvester of claim 9, wherein angle α is greater than 25 degrees.

11. The agricultural harvester of claim 10, wherein angle α is between 30 and 55 degrees.

12. An agricultural harvester, comprising:
    a chassis;
    a cleaning system carried by the chassis;
    a crop material elevator for receiving crop material that has passed through the cleaning system, the crop material elevator comprising:
        a top-most end;
        a bottom-most end opposite the top-most end;
        a first inlet between the top-most end and the bottom-most end; and
        a second inlet between the top-most end and the first inlet; and
    an auger system for supplying crop material from the cleaning system to the crop material elevator, the auger system comprising:
        a first auger defining an auger axis for supplying crop material to the first inlet;
        a second auger defining a second auger axis; and
        a crop material conveyor for supplying crop material from the second auger to the second inlet, wherein the crop material conveyor comprises a cross auger.

13. The agricultural harvester of claim 1, wherein the crop material elevator comprises a loop and a plurality of paddles connected to the loop.

14. The agricultural harvester of claim 13, wherein the loop is driven by a sprocket.

15. The agricultural harvester of claim 1, wherein the auger axis is generally parallel to the second auger axis.

16. The agricultural harvester of claim 1, wherein the bottom-most end of the crop material elevator is rounded.

17. The agricultural harvester of claim 1, wherein the crop material conveyor is configured to supply crop material from the second auger to the second inlet transverse to the second auger axis.

* * * * *